United States Patent [19]

Long

[11] Patent Number: 4,795,932

[45] Date of Patent: Jan. 3, 1989

[54] DOUBLE INSULATED MOTOR INCLUDING A MAGNET RETAINER

[75] Inventor: Benjamin E. Long, Columbus, Miss.

[73] Assignee: United Technologies Electro Systems, Inc., Columbus, Miss.

[21] Appl. No.: 81,263

[22] Filed: Jul. 31, 1987

[51] Int. Cl.[4] .................... H02K 5/08; H02K 21/26
[52] U.S. Cl. ..................... 310/154; 310/43; 310/89
[58] Field of Search .............. 310/43, 50, 154, 45, 310/47, 89, 254

[56] References Cited

U.S. PATENT DOCUMENTS

| 2,894,156 | 7/1959 | Kent | 310/154 |
|---|---|---|---|
| 3,422,294 | 1/1969 | Parker | 310/154 |
| 4,445,060 | 4/1984 | Ruehle et al. | 310/154 |
| 4,488,073 | 12/1984 | Morishita | 310/154 |
| 4,619,588 | 10/1986 | Moore, III | 310/154 |
| 4,626,178 | 12/1986 | Terumoto | 310/89 |

FOREIGN PATENT DOCUMENTS 1066659  10/1959  Fed. Rep. of Germany ........ 310/50

*Primary Examiner*—Patrick R. Salce
*Assistant Examiner*—D. L. Rebsch

[57] ABSTRACT

An electric motor including an insulating retainer for securing permanent magnets in position and providing secondary insulation for a double insulated motor. The insulating retainer includes a dielectric tubular body sized to fit within the motor housing, magnet retainers affixed to the tubular body for securing permanent magnets in position and alignment means for aligning the retainer within the motor housing to place the magnets in the optimum position within the motor housing.

14 Claims, 3 Drawing Sheets

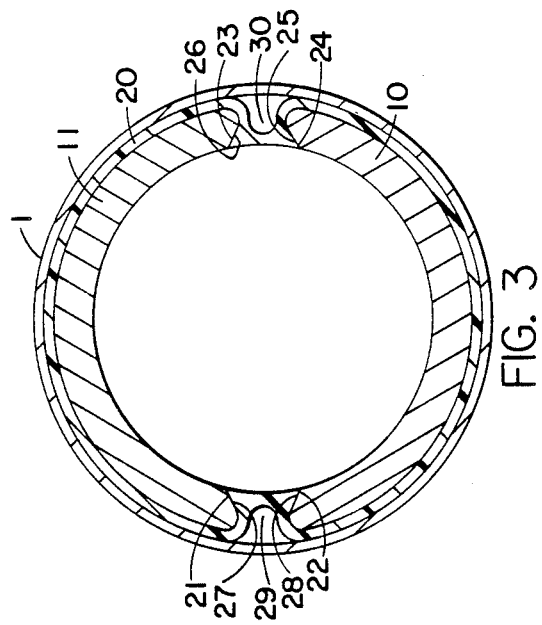
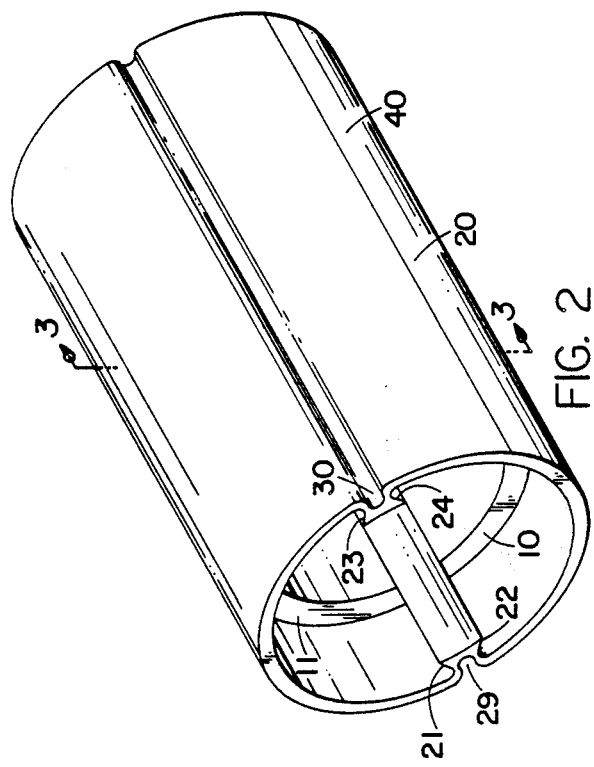

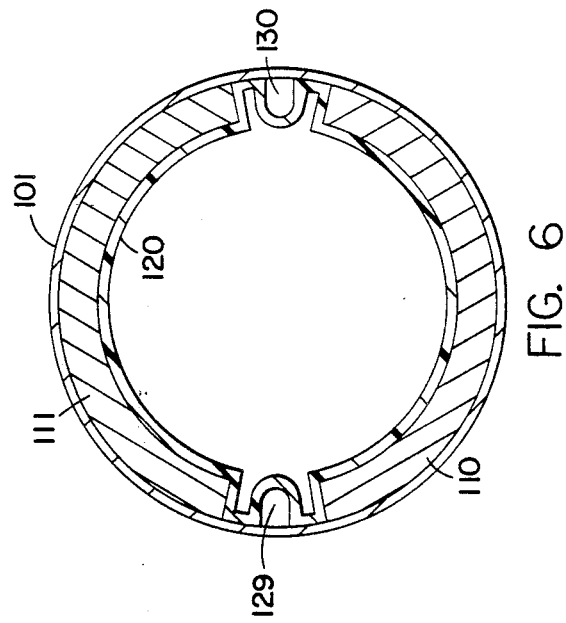
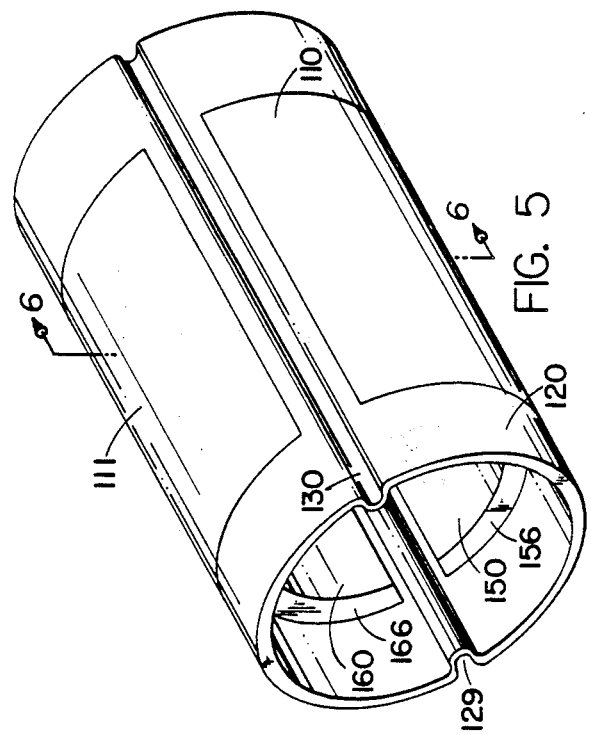

200~# DOUBLE INSULATED MOTOR INCLUDING A MAGNET RETAINER

TECHNICAL FIELD

The field to which this invention pertains is the field of electric motors and specifically double insulated electric motors and motors wherein a permanent magnet is fixed in a relative position within a motor housing.

BACKGROUND OF THE INVENTION

The present invention is directed toward an electric motor of the type that has a primary insulation system to isolate live conductors from portions of the motor that are normally not electrically energized (dead), and a secondary insulation system that isolates those portions of the motor which are susceptable to being contacted by an operator to prevent them from becoming electrically energized should the motor malfunction.

Heretofore, numerous schemes have been used to provide safety protection for motors that operate at sufficiently high power levels to be considered a potential shock hazard to the user should a normally dead conductive material, such as a moor housing, become electrically energized or live. A typical instance of inadvertent energization of a conductive, normally nonenergized material would be having an armature sling a winding to contact the motor housing, which in turn makes the motor housing live. Another instance would be if a brush wears to a point where the brush and/or the brush shunt becomes detached from the brush box and contacts a metal housing or end cap. Another example is to be found in motors wherein brush dust has accumulated in a location that provides an electrically conductive path from a live conductor to a normally nonenergized metal part.

In most motors it is customary practice to first insulate the armature windings from a lamination stack with suitable material, such as fish paper, or a suitable type of epoxy coating. This is considered to be primary insulation. A secondary insulation may then be placed between the lamination stack and the armature shaft so that if the winding should short to the lamination stack, the armature shaft will not become live. Another type of secondary insulation is a metal motor housing covered with an insulating material to prevent inadvertent contact by the user of the motor with a metal housing which may become live.

Other examples of primary insulation of the motor would include the insulation that separates the windings from the armature, the brush rigging from the metal housing or enclosure, such as an end cap, and the insulation that normally separates the various live conductors from the nonenergized metal parts including the power cord to the motor. Secondary insulation is that insulation which prevents physical contact with the normally dead or nonenergized metal part that may become live or energized due to a malfunction of the motor or an additional insulator which would prevent a normally nonenergized metal part from becoming live should the primary insulation fail or an insulator which would prevent operator contact with a normally nonenergized part which has become live.

During assembly of fractional horsepower permanent magnet motors, the positioning of the magnets of the motor relative to the commutated armature is important to obtain peak motor efficiency. One current method of assembling the motor is to adhesively secure ceramic magnets to the interior of the housing, to then heat treat the assembly to cure the adhesive to secure the magnets in position. However, it has been found that this type of assembly process allows possible minor variations to occur and the magnets may not always be secured in the best position to obtain the desired high efficiency of the motor. The herein-described magnet retainer not only provides an insulation layer for providing secondary insulation to the motor, but also provides means for securing a magnet in an identified position and means for orienting the retainer relative to the motor such that the magnets may be assembled to the retainer prior to the retainer being inserted into the housing. The retainer then fixes the magnets in the exact desired position to provide the desired high efficiency operation.

SUMMARY OF THE INVENTION

The present invention provides a simple, reliable, cost effective means of constructing a double insulated motor wherein a secondary insulation member is placed inside the motor housing.

It is an object of the herein invention to provide a double insulated electric motor utilizing a combination insulator and magnet retainer placed within the motor housing.

It is another object of the present invention to provide a magnet retainer which serves to position, protect, insulate and hold permanent magnet field members in a proper working relationship with respect to the armature during assembly and operation of the motor.

It is a still further object of the present invention to provide a double insulated motor that is highly reliable and cost effective to produce.

It is a further object of the present invention to provide a double insulated motor that utilizes at least one member to function as secondary insulation and also to position and hold in place permanent magnet field pieces during assembly of the motor and during operation of the motor.

It is a yet further object of the present invention to electrically insulate a permanent magnet field piece made of electrically conductive material from live conductors or from normally dead metal members that may become live as a result of a malfunction within the motor.

It is a still further object of the present invention to electrically insulate a permanent magnet field piece made of conductive material from an accessible metal housing in the event the magnet should become live as the result of a motor malfunction.

It is another object of the present invention to provide a safe, economical, reliable and easy to manufacture and assemble double insulated motor including a magnet retainer.

Other objects will be apparent from the description to follow and the appended claims.

The above objects are achieved according to an embodiment of the invention by the provision of an insulating retainer for securing permanent magnets of an electric motor having a housing while providing secondary insulation for the motor. The insulating retainer includes a dielectric tubular body sized to fit within a motor housing, magnet retainer means affixed to the tubular body for securing the permanent magnets to the motor in a preselected position, and means for orienting the tubular body relative to the housing. A magnet retainer means is disclosed having either a series of angled faces for retaining a magnet or a pocket defined by the tubular body into which the various magnets may be placed.

Also disclosed is a double insulated electric motor having a housing, end caps, thru bolts extending between the end caps, and at least one magnet, as well as an armature mounted to the housing for rotational displacement. The motor further includes a cylindrical retainer made from a dielectric material and sized to fit within said housing and said armature fitting with said retainer, said retainer further serving to electrically isolate the armature from the housing. The retainer further includes aligning means cooperating with the motor for aligning the retainer and the retainer includes extending magnet retainer means sized to receive and secure the magnets in a selected position.

Further disclosed is a method of assembling permanent magnets in an electric motor having a housing. The method includes the steps of providing an insulating retainer sized to fit within the motor housing and to secure the magnets to the motor in a desired position, mounting the magnets to a portion of the retainer sized to receive the magnets, and the step of inserting the retainer and the magnets assembled thereto into the housing such that the magnets are appropriately positioned and the retainer serves to insulate one portion of the motor from another portion.

BRIEF DESCRIPTION OF THE DRAWINGS

FIG. 2 is a perspective view of the magnet retainer and the magnets.

FIG. 3 is a sectional view of FIG. 2 taken at line III—III.

FIG. 5 is a perspective view of the retainer and the magnets assembled thereto.

FIG. 6 is a sectional view of FIG. 5 taken at line VI—VI.

PREFERRED EMBODIMENT OF THE INVENTION

The invention will be described with reference to a double insulated motor of a common construction having insulating end caps utilized in conjunction with the insulating magnet retainer. It is to be understood that other means of insulating the motor and means for insulating the armature motor may also be used to form a double insulated motor. The insulator and magnet retainer is described with reference to two embodiments herein. Other variations will be obvious to those skilled in the art and will be likewise suitable to secure magnets in a desired position while providing an insulating layer. Furthermore, the retainer may have applications where it is merely desirable to secure the magnets in the desired position and wherein the motor is not in and of itself double insulated, or that particular feature is not important.

Figure 1:
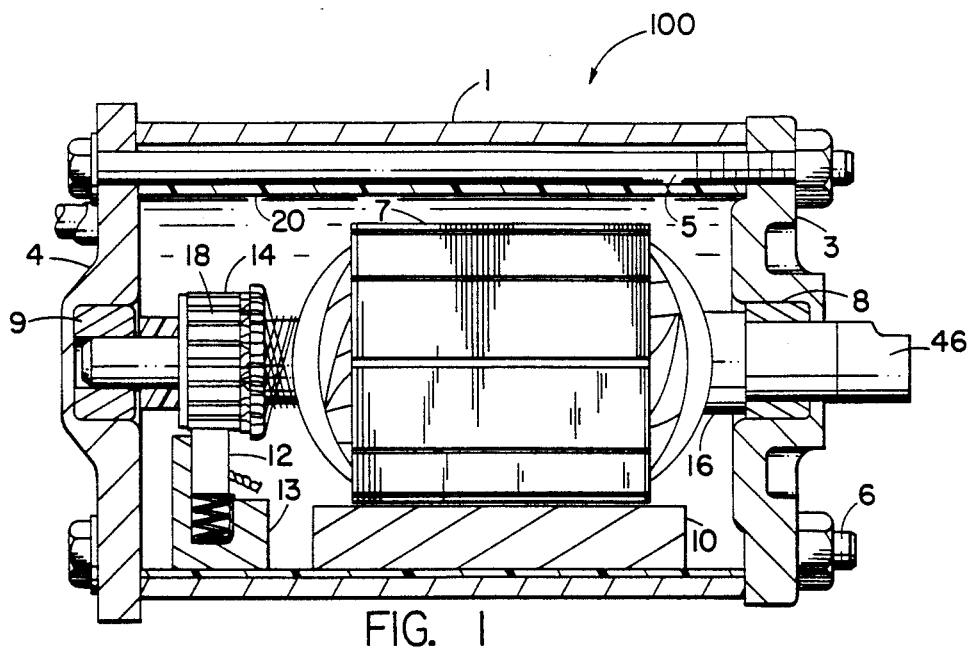
FIG. 1 is a sectional view of an electric motor including a magnet retainer.

Referring first to FIG. 1, motor 100 has metal housing 1 and end caps 3 and 4 formed from a dielectric material, which together define an enclosure. Thru bolts 5 and 6 extend from one end cap to the other end cap to maintain the motor in the desired configuration. The electrical components of the motor include armature 7 mounted for rotational movement on armature shaft 46 supported by bearings 8 and 9. Commutator 14 having bars 18 is supported on the armature shaft and is engaged by brush 12 mounted to brush retainer 13 for supplying electrical energy to the appropriate winding of the armature. Insulation tube 16 is a portion of the primary insulation which insulates the electrical current flowing through portions of the armature from the armature shaft. Permanent magnet 10 is shown mounted at the bottom of the motor and serves to provide a magnetic field which interacts with the fields created by the armature to cause rotation of the motor. Retainer member 20 is shown extending about the circumference of the motor interior of housing 1.

Referring now to FIGS. 2 and 3, there may be specifically seen the retainer member and magnets 10 and 11. In FIG. 2, the combination of the retainer member and magnets 10 and 11 are shown in perspective. Retainer member 20 has cylindrical body 40 sized to fit within the metal housing of the motor. The retainer additionally includes lips 21, 22 and 24, 26, said lips angling from the cylindrical body portion of the retainer member inwardly and at an angle to a radius such that magnets 11 and 10 having magnet faces 27, 28, as well as 25 and 26, all of which are angled in a complementary fashion to fit therewithin and be retained. In this manner, the magnets are secured by the magnet faces contacting the lips of the retainer member.

Thru bolt slots 29 and 30 extend axially the length of the retainer member. These slots are appropriately sized such that thru bolts 5 and 6 of the motor may be positioned therein once the motor is assembled. By positioning the thru bolts in these slots, the relative rotational alignment of the retainer member is determined. Hence, the rotational position of the retainer member in the housing is fixed to position the magnets in the desired location and the location or depth of the magnets within the retainer member is fixed by the position of the lips. Hence, the single retainer member, while having a tubular body, thru bolt slots, and the various lips, not only serves to provide an insulating layer about the interior perimeter of the housing, but also includes means for securing the magnets in the desired position.

Referring specifically to FIG. 3, the various relationships between the metal housing, the retainer member and the magnets are specifically seen. The insulating effect of the retainer member being spaced about the entire perimeter of the motor is evident therefrom. Additionally, it may be seen that the thru bolts are positioned such that they engage the exterior housing of the motor and are electrically insulated by a portion of the retainer member from the interior components of the motor. Hence, the insulating layer is provided around the entire interior periphery of the motor housing, including the thru bolts and the magnets are maintained in an appropriate desired position.

Figure 4:
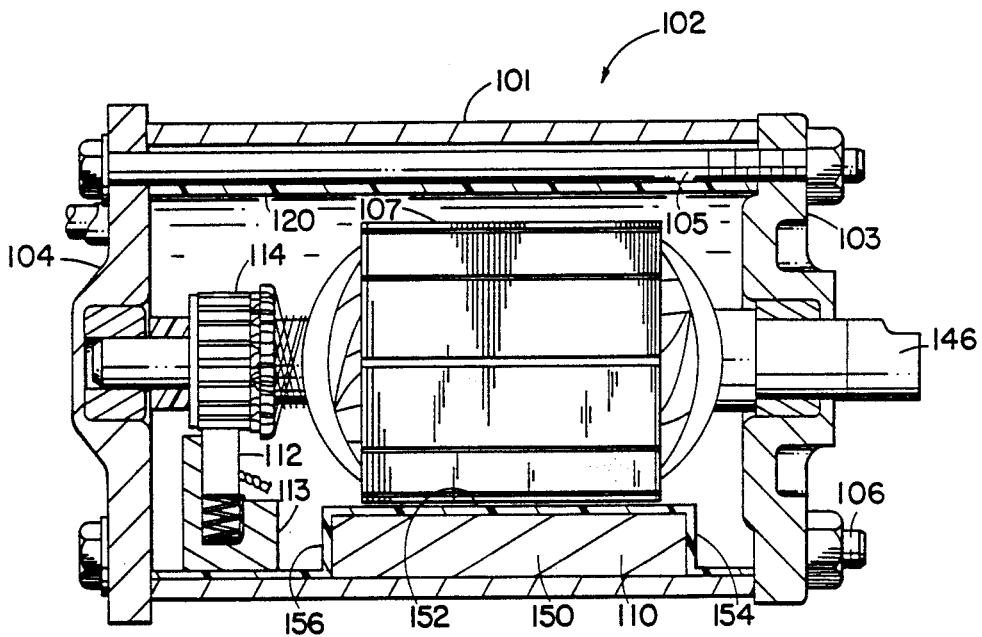
FIG. 4 is a sectional view of a motor having another embodiment of the retainer.

Referring now to FIGS. 4-6, there may be seen another embodiment of the invention. In FIG. 4, motor 102 is essentially identical to motor 100 of FIG. 1. The various enumerated components are the same as in FIG. 1, however, 100 has been added to all the reference numerals. Retainer member 120 is different from retainer 20 in that retainer member 120 defines pocket 150 having axial faces 156, and 154 and inner face 152. Magnet 110 is secured within this pocket such that it is positioned relative to the armature and within the motor housing. The other components of motor 102 are similar to those shown in motor 100.

Referring specifically to FIGS. 5 and 6, it may be seen that magnets 110 and 111 are secured within pockets 150 and 160 defined by retainer member 120. These pockets are sized such that a curvilinear ceramic magnet having the same outside diameter and the same radius of curvature as the retainer member may be secured in the appropriate pocket to form a cylindrical assembly with the retainer member. Thru bolt slots 129 and 130 are shown for receiving the thru bolts to the motor and for aligning the retainer member. Axial face 166 may be seen in FIG. 5 and it forms the end of the pocket sized to receive magnet 111.

FIG. 6 is a sectional view of FIG. 5 taken at lines VI—VI. The relationship between the magnets, the housing and the retainer member is clearly seen therein. Specific thru bolt slots 129 and 130 are also shown. In this embodiment, the retainer member 120 is sized to extend about an interior diameter less than that of the motor housing such that the magnets are secured between the housing and the retainer member. Hence, in this manner the entire exterior housing is insulated from inadvertent electrical contact upon failure of an internal component of the motor. The placing of the magnets in a pocket formed in the retainer member has not been found to create any significant impact upon the electrical performance of the motor. It has also been determined to be equally suitable to have the portion of the retainer that defines the thru bolt slot also be that portion which defines pocket 150 in the axial direction.

With either embodiment it is possible to provide for enhanced assembly techniques. The previous methods of assembling electric motors have included forming ceramic magnets, bonding those magnets to the interior of the housing, curing the adhesive in an oven, and thereafter, electrically magnetizing the magnets to create the desired magnetic field therein. With a retainer device as disclosed herein, it is possible to appropriately energize the magnet and to then mount that magnet to the retainer and merely slide the retainer/magnet combination into the motor housing. It is also possible to magnetize the magnets after the magnets and the retainer have been installed into the motor housing by using appropriate magnetizing equipment and fixtures. The thru bolts slots are utilized to appropriately align the retainer within the housing. The retainer further serves to appropriately position in the axial direction the magnets within the housing. In this manner, both rotationally and axially the magnets are placed in the exact desired position for obtaining the best electrical performance of the motor. Any potential errors due to the various bonding, heat treating and magnetizing processes may be avoided and use of such a retainer may promote automated assembly of electric motors.

The invention has been described with reference to particular embodiments, however, it is to be understood by those skilled in the art that variations and modifications can be effected within the spirit and scope of the invention.

I claim:

1. An insulating retainer for securing permanent magnets of an electric motor having a generally cylindrical housing and end cap means at each end of the housing while providing secondary insulation for the motor which comprises:
   a dielectric tubular body sized to fit within the motor housing and extend the length of the housing between the end cap means;
   magnet retainer means affixed to the tubular body for securing the permanent magnets of the motor in a preselected position; and
   means for orienting the tubular body relative to the orientation of the housing.

2. The apparatus as set forth in claim 1 wherein the electric motor includes a thru bolt and wherein the means for orienting comprises a thru bolt slot sized to receive the thru bolt thereby positioning the retainer within the motor.

3. The apparatus as set forth in claim 1 wherein the magnet retainer means comprises at least one pair of angled lips extending inwardly from the tubular body and angled from a radius such that a curved permanent magnet having angled magnet faces may be supported in position by said magnet faces contacting said lips.

4. The apparatus as set forth in claim 1 wherein the magnet retainer means comprises a pocket defined by the tubular body, said pocket extending inwardly from the tubular body and being sized to receive a permanent magnet.

5. A double insulated electric motor having a housing, end caps, thru bolts extending between the end caps, ar least one magnet and an armature mounted to the housing for rotational displacement which comprises:
   a cylindrical retainer made from a dielectric material and sized to fit within said housing and said armature fitting within said retainer, said retainer further serving to electrically isolate the armature from the housing,
   said retainer defining means cooperating with the motor for aligning said retainer; and
   said retainer further having extending magnet retainer means sized to receive and secure the magnet in a selected position.

6. The apparatus as set forth in claim 5 wherein the magnet retainer means further comprises inwardly angled complementary lips sized to receive and secure the magnet.

7. The apparatus as set forth in claim 6 wherein the motor has two magnets and wherein the magnet retainer means comprises two sets of angled complementary lips, one set for each magnet to be secured, each magnet including complementary magnet faces cooperating with said lips.

8. The apparatus as set forth in claim 5 wherein the magnet retainer means further comprises at least one magnet pocket sized to receive and secure a magnet in position.

9. The apparatus as set forth in claim 8 wherein the retainer including the magnet retainer means is an integral part made from a dielectric material.

10. The apparatus as set forth in claim 5 wherein the retainer defining means cooperating with the motor for aligning the retainer is at least one axially extending bolt slot positioned to mate with a thru bolt of the motor to fix the position of the retainer.

11. An insulating retainer for securing permanent magnets for use with an electric motor having a housing and for providing secondary insulation for the motor which comprises:
   a dielectric generally tubular body sized to fit within the motor housing;
   a magnet retainer means incorporated as a portion of the tubular body for securing the permanent magnets to the tubular body regardless of whether the tubular body is within the housing of the electric motor; and means for orienting the tubular body relative to the housing to place the permanent magnets in the desired position within the housing.

12. The apparatus as set forth in claim 11 wherein the electric motor includes a thru bolt and wherein the means for orienting comprises a thru bolt slot sized to receive the thru bolt thereby positioning the retainer within the motor.

13. The apparatus as set forth in claim 11 wherein the magnet retainer means comprises at least one pair of angled lips extending inwardly from the tubular body and angled from a radius such that a curved permanent magnet having angled magnet faces may be supported in position by said magnet faces contacting said lips.

14. The apparatus as set forth in claim 11 wherein the magnet retainer means comprises a pocket defined by the tubular body, said pocket extending inwardly from the tubular body and being sized to receive a permanent magnet.

* * * * *